United States Patent [19]

Hawk et al.

[11] Patent Number: 4,475,387
[45] Date of Patent: Oct. 9, 1984

[54] HIGH TEMPERATURE MASS FLOWMETER

[75] Inventors: Charles E. Hawk, Newport News; Jonathan T. Whitcomb, Hayes, both of Va.

[73] Assignee: Teledyne Industries, Inc., Los Angeles, Calif.

[21] Appl. No.: 477,878

[22] Filed: Mar. 23, 1983

[51] Int. Cl.³ ............................ G01F 5/00; G01F 1/68
[52] U.S. Cl. ......................................... 73/202; 73/204; 73/861.02
[58] Field of Search ...................... 73/202, 204, 861.02, 73/861.03; 364/510

[56] References Cited

U.S. PATENT DOCUMENTS

| 2,586,060 | 2/1952 | Kronberger | 73/204 X |
| 2,594,618 | 4/1952 | Booth, Jr. | 73/202 X |
| 2,729,976 | 1/1956 | Laub | 73/204 |
| 3,559,482 | 2/1971 | Baker et al. | 73/204 |
| 3,805,610 | 4/1974 | Jacobs | 73/202 |

Primary Examiner—Charles A. Ruehl
Attorney, Agent, or Firm—Cushman, Darby & Cushman

[57] ABSTRACT

Apparatus is provided for measuring the flow of high temperature fluid through a main line. A shunt path diverts a portion of the fluid flowing in the main line. The shunt path is so designed as to thermally isolate a flowmeter positioned in the shunt path from the transfer of heat from the main line. The flowmeter produces an output signal. This signal, and one produced by a temperature sensor in the main line, are applied to a correction circuit which produces an output indicating the actual flow of fluid in the main line.

6 Claims, 3 Drawing Figures

FIG. 1
(PRIOR ART)
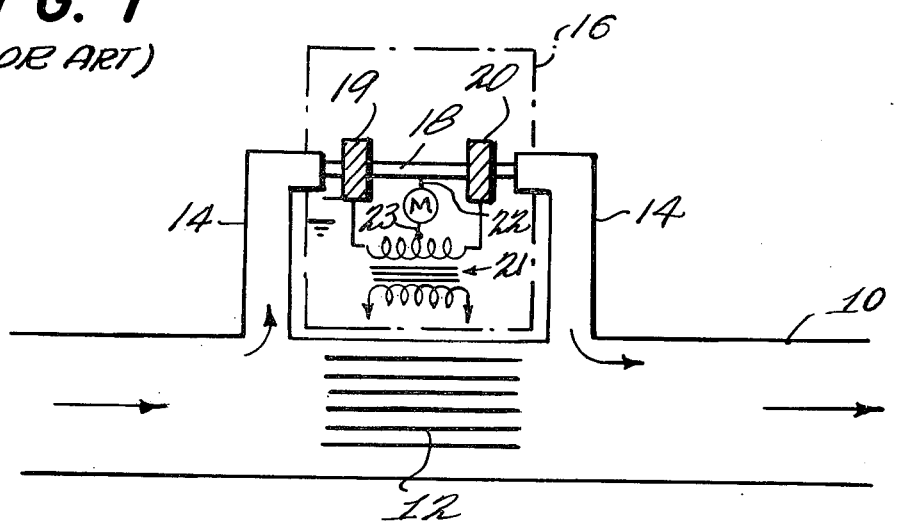
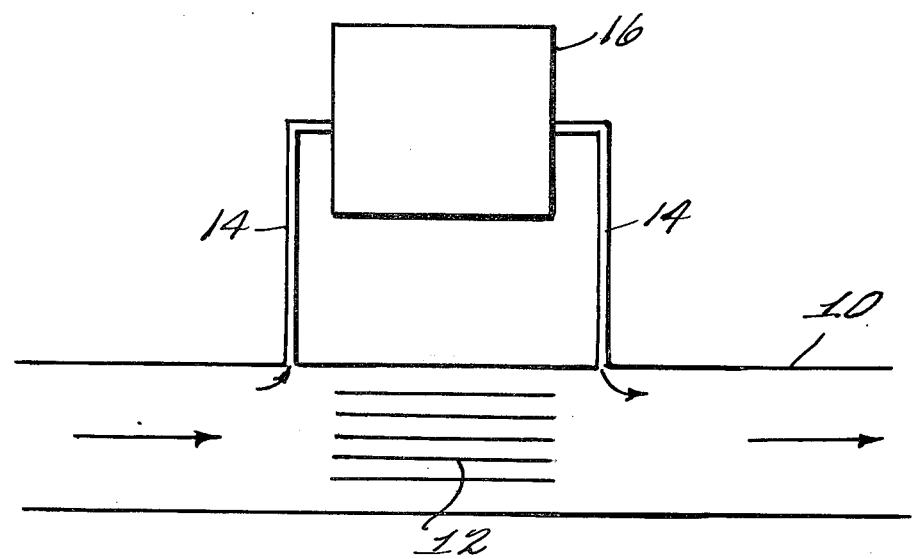
FIG. 2

HIGH TEMPERATURE MASS FLOWMETER

BACKGROUND OF THE INVENTION

The present invention is directed to an improvement in apparatus known as shunt flowmeters which measure the flow of fluid through a main supply line. Typically, such flowmeters employ a by-pass, or shunt path, to divert a fraction of the flow in the main line. This shunt path incorporates a sensor which measures the fractional part of the flow in the shunt path to determine the total flow in the main supply line.

The sensor which is employed typically comprises a heated length of capillary-like tubing supported at its ends by heat sinks and having one or more thermocouple junctions intermediate its ends. The temperature sensed at the thermocouple junction(s) is a function of the rate of flow of fluid through the capillary. Examples of such sensors are disclosed in U.S. Pat. Nos. 3,181,357 and 3,229,522, issued respectively on May 4, 1965 and Jan. 18, 1966 to James M. Benson, and in U.S. Pat. Nos. 4,245,503 and 4,270,386 issued respectively on Jan. 20, 1981 and June 2, 1981 to Charles E. Hawk, et al.

These flowmeters are intended to measure the amount of heat transferred to the gas stream, and as such are mass flowmeters. The (M) mass of a gas passing through the heated conduit is proportional to the (H) heat input divided by the (Cp) heat capacity and the change in temperature ($\Delta T$) of the gas, i.e., $M = H/Cp \Delta T$. Since heat capacity is very stable with changes in static pressure and temperature, the relationship is not affected by these parameters over normally encountered limits.

When sensors of the type just described are used in shunt flowmeters, the main line and the shunt characteristics must be such that the branching ratio remains constant, independent of pressure or temperature variations. This is accomplished by constructing a laminar flow "obstruction" in the main line to divert flow through the sensors which are approximately identical in diameter and length to the sensor conduit. The main line is constructed of a multiple of these conduits such that the total flow is directly related to the sensor conduit by the ratio of the number of conduits in the main line.

Under conditions wherein the flowing fluid being measured is at a temperature less than about 50° C., the sensor, which is calibrated to normal ambient temperature, operates in a predictable fashion. However, since the sensor is positioned close to the main line by relatively short conduit sections, the passage of high temperature fluid through the main line and the shunt path exposes the sensor to temperature conditions which affect its reliability. For example, the resistances of the heated tubing and its heating devices increase, and the thermal conductivity of the gas surrounding the heated conduit varies. As a result, the temperature gradients along the heated capillary are no longer the same as when the sensor was calibrated at room temperature, and the fluid flow measurements consequently contain substantial error. Due to the long time periods required to reach temperature equilibrium, recalibration of the sensor for higher than ambient temperatures is impractical, and similarly, conventional devices are useless under conditions of rapid high temperature changes.

SUMMARY OF THE INVENTION

The present invention overcomes the inability of previously known arrangements to accurately measure the flow of fluids at high temperatures. More particularly, the sensor is thermally isolated from the main line by employing in the sensor-containing shunt path conduits of substantially lesser diameter than the main line, these conduits having lengths which physically separate the sensor a significant distance from the main line. A viscosity correction network is combined with such an arrangement which measures the temperature of the flowing fluid and provides a correction to the sensor's output.

DETAILED DESCRIPTION OF THE INVENTION

The invention will become more fully apparent when considered in light of the following detailed description of an illustrative embodiment thereof and by reference to the accompanying drawings, wherein:

FIG. 1 is a schematic drawing, partially in section, illustrating a prior art fluid flowmeter;

FIG. 2 is a schematic drawing illustrating the sensor portion of the prior art fluid flow measuring apparatus of FIG. 1 as being thermally isolated from the main line.

Figure 3:
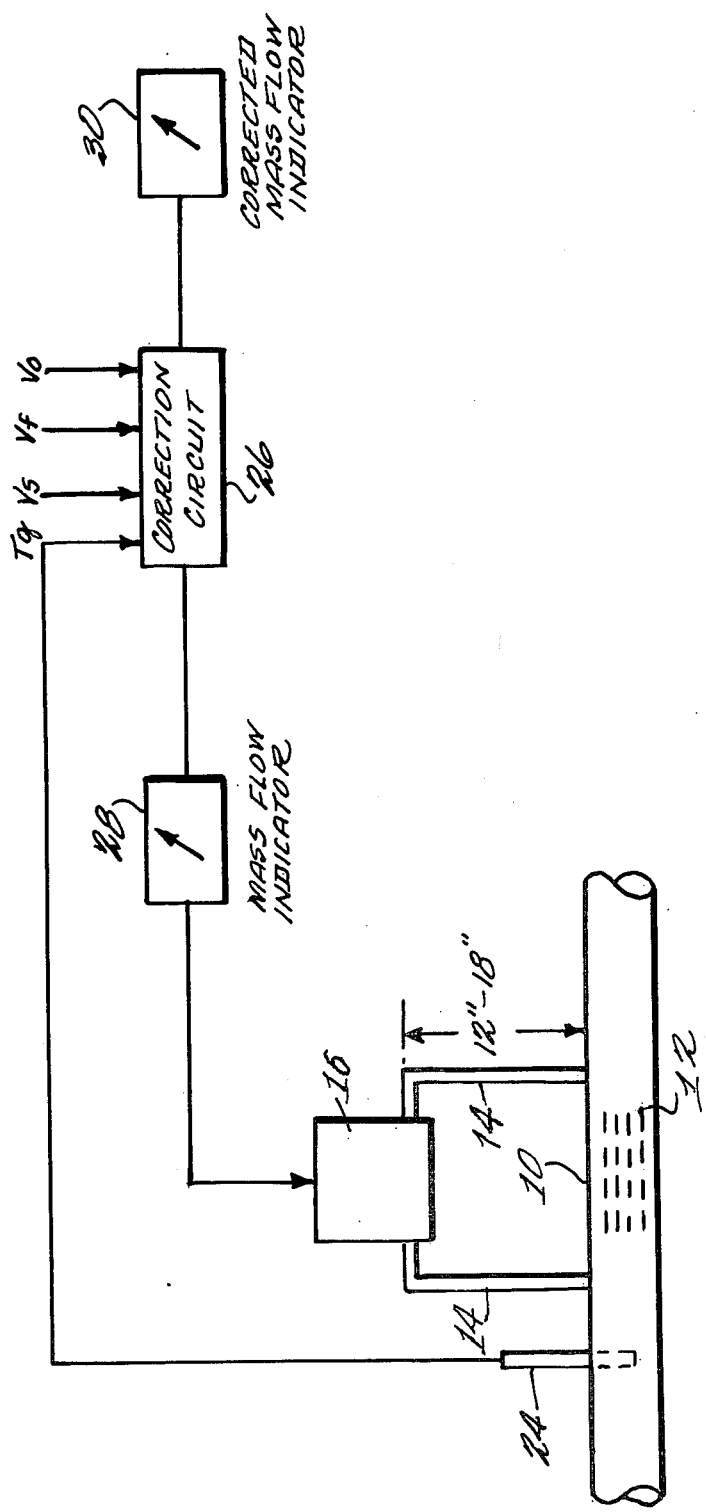
FIG. 3 schematically illustrates the flow measuring apparatus of FIG. 2 in combination with a viscosity correction network for measuring the flow of a high temperature fluid.

Referring to FIG. 1, a typical prior art thermal fluid flow measuring apparatus is illustrated which measures the fluid flow in a main supply line, designated by the numeral 10, the fluid moving in a direction indicated by the arrowheads. A restrictive element 12 comprising a laminar flow element is provided in line 10.

A shunt path 14 containing thermal mass flowmeter 16 bridges element 12 to divert a portion of the fluid streaming in the main line. A capillary conduit section 18 is provided in shunt path 14. Capillary 18 is a part of flowmeter 16. The passages through laminar element 12 are of approximately the same cross-sectional area and length as capillary section 18. This is necessary to insure a constant branching ratio between laminar element 12 and heated capillary section 18 since all capillaries are similarly affected by changes in static pressure and temperature of the flowing fluid. Section 18 is electrically and thermally conductive and is coupled at its ends to heat sinks 19 and 20. The heat sinks are characterized as masses of material which remain substantially at the ambient temperature of their surroundings, even when heating current is passed through the sinks and through capillary section 18. However, due to the fact that the capillary is of lesser mass than the heat sinks, it is heated to a temperature above its ambient surroundings as current is passed therethrough. A transformer 21 is connected to heat sinks 19 and 20 to drive heating current through capillary section 18 when the transformer is energized. A thermoelectric device 22, such as a thermocouple, is located along capillary 18. The thermoelectric device is connected through a meter M to point 23 on the secondary winding of transformer 21. Assuming that the secondary winding is of the same material as the heat sinks to which the winding is connected at its ends, the meter M responds to the difference in temperature between the junction point of the thermoelectric device and the heat sinks. The temperature sensed by the thermoelectric device 22 is proportional to the flow in the capillary section 18. Therefore, with the knowledge of the splitting ratio between the main supply line 10 and the shunt path 14, the meter M may be calibrated to indicate total mass flow of the fluid flow in the main line independently of static pressure changes in accordance with the same theory discussed above with respect to prior art flowmeters.

While the arrangement just described provides excellent flow measuring results over a wide fluid pressure range and for temperatures below 50° C., large errors occur when the apparatus is exposed to higher temperature fluids. The reasons for this have been detailed previously.

In order to overcome this problem, the sensor is thermally isolated from the remainder of the apparatus. This can be appreciated by reference to FIG. 2 wherein the apparatus illustrated corresponds with that of FIG. 1 except that the shunt path 14 includes conduit portions having significantly lesser diameter than that of the main line, and the lengths of these conduit portions are such as to physically position the flowmeter 16 in a substantially spaced relationship with respect to the remaining portions of the apparatus. As a practical example, for a main line having a diameter of 1" or more, the conduit portions of path 14 comprise ¼" diameter stainless steel tubing in lengths of 12"–18".

With such a thermally isolated arrangement, and with the amount of heated fluid flowing through shunt path 14 and the capillary portion 18 of the flowmeter 16 being so small, not enough heat is directed to the sensor to alter its operation from that which would occur at ambient room temperature for which the sensor is calibrated. Consequently, the flowmeter may be used to measure high temperature fluid flow, independently of static pressure variations, in the manner now to be described.

As heated fluid passes at an extremely low volume through the thermally isolated flowmeter, the temperature of the fluid is substantially reduced to approach room temperature. This cooling changes its viscosity. As a result, the flow measurement produced by the sensor is distorted due to its being dependent on a fluid viscosity different from the actual viscosity of the heated fluid in the main line.

Consequently, a correction to the sensor's output is required to provide an accurate indication of actual fluid flow. This is accomplished in the manner illustrated in FIG. 3.

Referring to the drawing, a temperature sensor 24 is inserted within the main line 10. The output of the sensor is applied as one input to a correction circuit 26. The output of the mass flowmeter 16 displayed by an indicator 28 also is directed as an input to the circuit 26. Additional circuit inputs are:

$v_s$, the viscosity (in micropoise) of the fluid being measured [at standard (70° F.) condition].

$v_o$, the viscosity (in micropoise) of the fluid being measured [at 1° F.]; and $v_f$, the viscosity change (in micropoise) ° F. of the fluid being measured.

Obviously, these inputs $v_s$, $v_o$ and $v_f$ can be programmably applied to circuit 26.

It is known that for changes in flow resulting from viscosity variations, the actual flow can be determined by utilizing the flow measurement indicated by a sensor which is calibrated to standard ambient conditions, and by the temperature of the fluid, in accordance with the formula:

$$\text{Flow (Actual)} = \text{Flow (Indicated)} \left[ \frac{T_s}{T_a + T_g} \right] \left[ \frac{v_s}{v_f T_g + v_o} \right]$$

where:
Ta = a constant (459.57°)
Ts = a constant (Ta + 70°)
Tg = the measured temperature Circuit 26 is arranged in conventional fashion to perform the calculation according to this formula, and the circuit's output is applied to the corrected mass flow indicator 30 to display the actual flow of the high temperature fluid.

With an arrangement of the type which has been described, it is possible to obtain less than 1% errors for variation in temperatures from 0° to at least 400° F. and for pressure variations from atmospheric to at least 100 PSIG. The laminar flow element in the main line being formed of foil approximately 0.002" thick, rapid response to temperature changes of the fluid occurs resulting in accurate flow measurements being obtained within a minute of the fluid's temperature stabilization.

What is claimed is:

1. Apparatus for measuring fluid flow through a main supply line independently of static pressure variations therein, comprising:
   (a) a restrictive element within the main line for developing a differential pressure thereacross, said element being formed from a material which rapidly responds to changes in fluid temperature;
   (b) a shunt path connected to the main line to divert fluid at the higher pressure side of the restrictive element and to return the fluid to said main line at the lower pressure side of the restrictive element, said restrictive element and the shunt path being of substantially the same diameter and length so as to divide flow in a constant branching ratio independently of static pressure variations;
   (c) a thermal flowmeter connected in said shunt path, said flowmeter including means responsive to the flow of fluid through the shunt path for developing an output signal;
   (d) means for thermally isolating said flowmeter from the main line whereby in the presence of fluid flow at an elevated temperature in said main line, the fluid flowing in said shunt path is reduced in temperature to substantially the ambient temperature of the flowmeter's surroundings;
   (e) means for sensing the temperature of the fluid in said main line; and
   (f) circuit means responsive to the sensed temperature and the thermal flowmeter output signal for providing an output representative of the actual fluid flow in said main line.

2. Apparatus as set forth in claim 1, wherein said circuit performs a calculation according to the formula:

$$\text{Flow (Actual)} = \text{Flow (Indicated)} \left[ \frac{T_s}{T_a + T_g} \right] \left[ \frac{v_s}{v_f T_g + v_o} \right]$$

wherein:
Ta is a constant (459.57°);

Ts is a constant (Ta+70°);
Tg is the sensed temperature;
$v_s$ is the viscosity of the fluid being measured; [at standard (70° F.) conditions];
$v_o$ is the viscosity of the fluid being measured; [at 0° F.]; and
$v_f$ is the viscosity change/° F. of the fluid being measured.

3. Apparatus as set forth in claim 1, wherein said means for thermally isolating said flowmeter from the main line comprises:
   conduit portions in the shunt path having diameters substantially smaller than that of the main line and having extended lengths to physically position the flowmeter at a location where the flowmeter is substantially unaffected by heat transferred from the main line.

4. Apparatus as set forth in claim 3, wherein said circuit performs a calculation according to the formula:

$$\text{Flow (Actual)} = \text{Flow (Indicated)} \left[ \frac{Ts}{Ta + Tg} \right] \left[ \frac{v_s}{v_f Tg + v_o} \right]$$

wherein:
   Ta is a constant (459.57°);
   Ts is a constant (Ta+70°);
   Tg is the sensed temperature;
   $v_s$ is the viscosity of the fluid being measured; [at standard (70° F.) conditions];
   $v_o$ is the viscosity of the fluid being measured; [at 0° F.]; and
   $v_f$ is the viscosity change/° F. of the fluid being measured.

5. Apparatus as set forth in claim 4, wherein said restrictive element is a laminar flow element.

6. Apparatus as set forth in claim 1, wherein said restrictive element is a laminar flow element.

* * * * *